US012783585B2

(12) United States Patent
Abraham

(10) Patent No.: US 12,783,585 B2
(45) Date of Patent: Nov. 3, 2026

(54) DYNAMIC CONTEXT-BASED EVALUATION OF LANGUAGE MODELS

(71) Applicant: Dell Products L.P., Round Rock, TX (US)

(72) Inventor: Misha Abraham, Tiperary (IE)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/095,644

(22) Filed: Mar. 31, 2025

(65) Prior Publication Data

US 2026/0300401 A1 Oct. 1, 2026

(51) Int. Cl.
*G06F 16/903* (2019.01)
*G06F 40/40* (2020.01)

(52) U.S. Cl.
CPC ........ *G06F 16/90335* (2019.01); *G06F 40/40* (2020.01)

(58) Field of Classification Search
CPC ........................... G06F 16/90335; G06F 40/40
See application file for complete search history.

(56) References Cited

U.S. PATENT DOCUMENTS

2024/0378394 A1* 11/2024 Kotikalapudi .......... G06F 40/40
2025/0094789 A1* 3/2025 Lu ........................... G06F 40/30
2025/0117671 A1* 4/2025 DeVos .................. G06F 16/243
2025/0130779 A1* 4/2025 Nguyen ..................... G06F 8/34
2025/0209099 A1* 6/2025 Jensen .................. G06F 16/332
2025/0259018 A1* 8/2025 Kocienda ................ G06F 40/40
2025/0292016 A1* 9/2025 Malkemus .............. H04L 51/02
2025/0342360 A1* 11/2025 Varerkar ................ G06N 3/088

OTHER PUBLICATIONS

Malaviya et al.; "Contextualized Evaluations: Taking the Guesswork Out of Language Model Evaluations"; arXiv:2411.07237v1 [cs.CL] Nov. 11, 2024.
Jain, Sulbha; "Contextualized Evaluations: Taking the Guesswork Out of Language Model Evaluations—Paper Review"; Dec. 3, 2024.
Yang et al.; "Rewards-in-Context: Multi-Objective Alignment of Foundation Models with Dynamic Preference Adjustment"; arXiv preprint arXiv:2402.10207 (2024).
Rahim et al.; "Continuous Reinforcement Learning-Based Dynamic Difficulty Adjustment in a Visual Working Memory Game"; arXiv preprint arXiv:2308.12726 (2023).

* cited by examiner

*Primary Examiner* — Jared M Bibbee
(74) *Attorney, Agent, or Firm* — Ryan, Mason & Lewis, LLP

(57) ABSTRACT

Techniques are provided for dynamic context-based evaluation of language models. One method comprises accessing a data structure comprising information characterizing a user input and a corresponding context of the user input; dynamically identifying, in response to the user input, evaluation criteria, from a pool of evaluation criteria, based on the context of the user input; dynamically generating evaluation metrics based on the identified evaluation criteria; applying the user input to at least one language model, wherein the at least one language model generates a response based on the user input; evaluating the response from the at least one language model using the dynamically generated evaluation metrics to assign a score to the response; and initiating an automated action based on the score assigned to the response. A weight may be assigned to the evaluation metrics based on the context of the user input.

20 Claims, 13 Drawing Sheets

DYNAMIC CONTEXT-BASED EVALUATION OF LANGUAGE MODELS

BACKGROUND

As the value and use of information continues to increase, individuals and organizations seek additional ways to process and/or store information. Information processing systems may be used to process, compile, store and/or communicate various types of information, for example, including through the use of artificial intelligence (AI) and/or machine learning (ML).

SUMMARY

Illustrative embodiments of the disclosure provide techniques for dynamic context-based evaluation and/or modification of language models. One method includes accessing at least one data structure comprising information characterizing at least one input from a user and a corresponding context of the at least one input; dynamically identifying, in response to the at least one input from the user, one or more evaluation criteria, from a plurality of evaluation criteria, based at least in part on the context of the at least one input; dynamically generating one or more evaluation metrics based at least in part on the one or more identified evaluation criteria; applying at least a portion of the input from the user to at least one language model, wherein the at least one language model generates at least one response based at least in part on the input from the user; evaluating the at least one response from the at least one language model using the dynamically generated one or more evaluation metrics to assign a score to one or more of the at least one response; and initiating at least one automated action based at least in part on the score assigned to the one or more responses.

Illustrative embodiments can provide significant advantages relative to conventional techniques. For example, technical problems related to such conventional techniques are mitigated in one or more embodiments by dynamically identifying evaluation criteria and corresponding evaluation metrics for evaluating at least one language model, based on a context of a user input, and evaluating at least one response from the at least one language model using the dynamically generated evaluation metrics.

These and other illustrative embodiments described herein include, without limitation, methods, apparatus, systems, and computer program products comprising processor-readable storage media.

DETAILED DESCRIPTION

Figure 1:
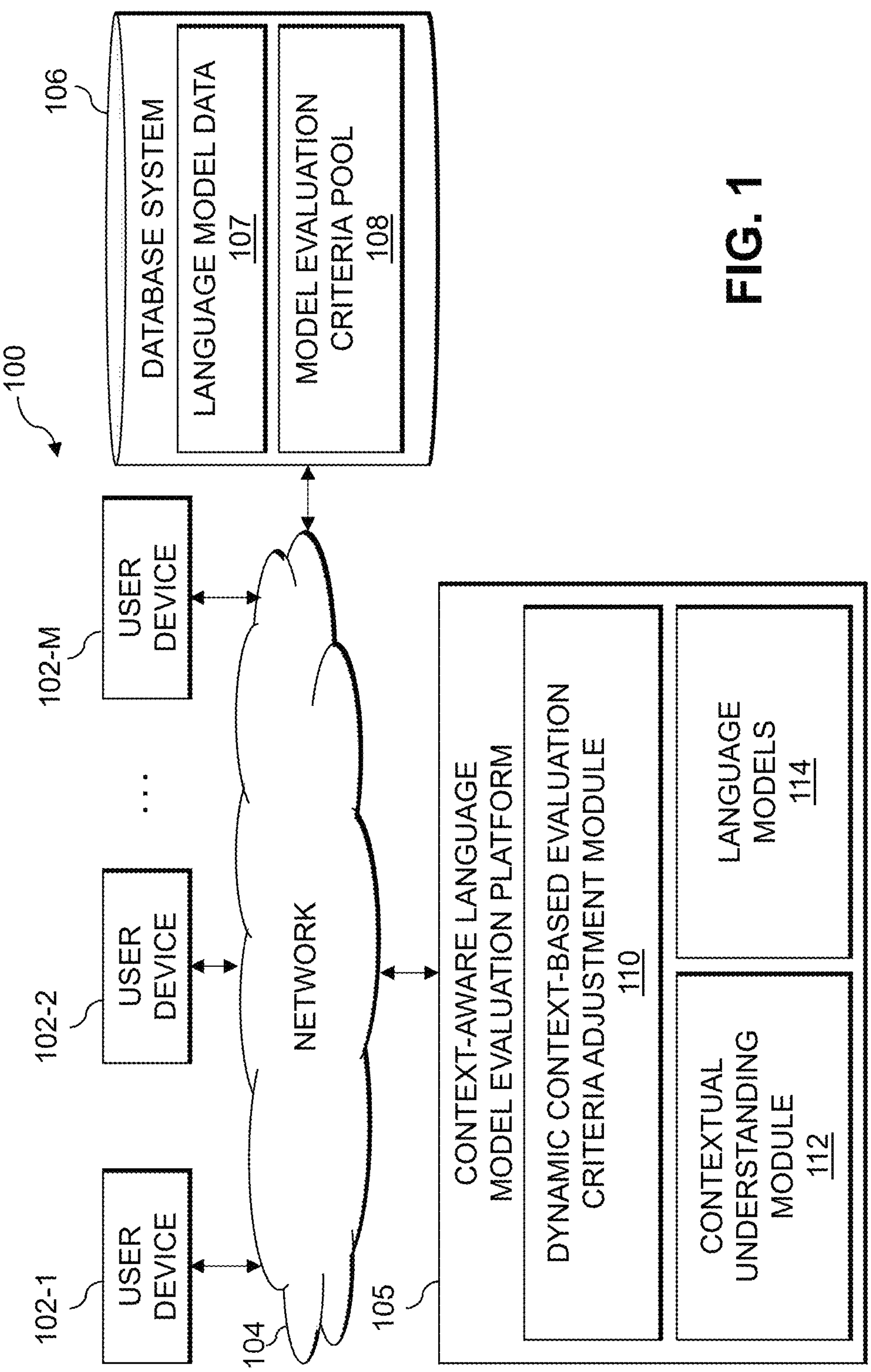
FIG. 1 illustrates an information processing system configured for dynamic context-based evaluation of language models in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for dynamic context-based evaluation of language models.

In some embodiments, the disclosed techniques for dynamic context-based evaluation of language models dynamically adjust one or more evaluation criteria for a language model, such as a large language model (LLM), based on a context of a user input to the language model. Natural language processing (NLP) techniques, real-time context analysis and adaptive learning algorithms are leveraged in one or more embodiments to provide a more accurate and relevant assessment of language model performance. In this manner, the language model evaluation is tailored to the unique requirements of a given use case, thereby enhancing the overall effectiveness and applicability of language models in various domains (e.g., customer support, healthcare, finance and education).

One or more aspects of the disclosure recognize that existing methods for evaluating language models often rely on static criteria that do not account for the diverse and dynamic nature of real-world use cases (potentially leading to inaccurate assessments and suboptimal performance of language models in specific contexts). For example, a language model evaluated primarily based on factual accuracy may perform poorly in creative writing tasks, while a language model optimized for empathy may not excel in technical support scenarios. Thus, there is a need for a context-specific evaluation engine that can generate an evaluation matrix in real time, tailored to the specific use case or context of the language model being evaluated.

In one or more embodiments, the disclosed context-aware language model evaluation platform dynamically identifies one or more evaluation criteria for a language model based at least in part on a context of a user input to the language model. One or more evaluation metrics (e.g., based at least in part on the identified evaluation criteria) may be dynamically adjusted to prioritize relevant aspects such as accuracy, relevance, empathy and/or creativity. Responses from the language model may be scored based on the adjusted evaluation metrics (e.g., ensuring immediate and contextually relevant feedback).

In this manner, the disclosed context-aware language model evaluation platform generates an evaluation matrix in real time, tailored to the specific context of the language model being evaluated, and applies weights to each evaluation criterion accordingly. It can be shown that the context-specific evaluation matrix outperforms traditional static criteria as the evaluation matrix is specifically designed for each unique use case, ensuring more accurate and relevant assessments of language models.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a context-aware language model evaluation platform 105 and a database system 106.

The user devices 102 may comprise, for example, devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising one or more processing devices configured to communicate using internet protocol (IP) or other related communication protocols.

The context-aware language model evaluation platform 105 may comprise a dynamic context-based evaluation criteria adjustment module 110, a contextual understanding module 112 and one or more language models 114. The dynamic context-based evaluation criteria adjustment module 110, in some embodiments, may dynamically adjust evaluation criteria based on a context of a user input (e.g., to ensure that the evaluation is relevant to the specific use case) and develop a set of scoring metrics (such as metrics for accuracy, relevance, empathy and/or creativity, which may be weighted differently depending on the context) that dynamically change based on the identified context, as discussed further below in conjunction with FIGS. 5 through 9, for example. In at least some embodiments, the contextual understanding module 112 may employ NLP techniques to parse and understand the context of the user input, as discussed further below in conjunction with FIGS. 2 through 4, for example.

The term "language model" in this context and elsewhere herein is intended to be broadly construed so as to encompass, for example, NLP models that are trained on massive amounts of data (e.g., possibly hundreds of gigabytes or more) to understand, summarize, generate and/or predict a response (e.g., a next word in a sentence based on a context provided by the preceding words). Such language models are also commonly referred to as LLMs (e.g., GPT-4, BERT (bidirectional encoder representations from transformers) and other language models). Language models often are implemented using transformer-based architectures. Evaluating the performance of such language models remains a complex and multifaceted challenge. Traditional evaluation methods often rely on static criteria, which do not account for the diverse and dynamic nature of real-world applications.

Transformer-based architectures can process an input through a sequence of transformers, where each transformer includes a self-attention layer and feed-forward layer. The self-attention layer computes an importance of each token in a sequence of input tokens, and the feed-forward layer transforms the output of the self-attention layer into a form suitable for the next transformer in the sequence. It is noted that this is merely one example of a language model architecture, and other architectures can also be used, such as Long Short-Term Memory (LSTM) architectures.

It is to be appreciated that this particular arrangement of elements 110, 112 and/or 114 illustrated in the context-aware language model evaluation platform 105 of the FIG. 1 embodiment is presented by way of example only, and alternative arrangements can be used in other embodiments. For example, the functionality associated with the elements 110, 112 and/or 114 in other embodiments can be combined into a single element, or separated across a larger number of elements. As another example, multiple distinct processors can be used to implement different ones of the elements 110, 112 and/or 114 or portions thereof.

At least portions of elements 110, 112 and/or 114 may be implemented at least in part in the form of software that is stored in memory and executed by a processor.

Additionally, the database system 106 may comprise one or more databases, such as a language model data database 107 (e.g., comprising information characterizing one or more language models of an organization) and a model evaluation criteria pool 108 (e.g., comprising information characterizing available evaluation criteria for evaluating the language models of an organization). The databases 107 and 108 may be configured to store data, for example, in tables, in a known manner. While the databases 107 and 108 are illustrated in FIG. 1 as comprising distinct databases, at least portions of the databases 107 and 108 may be implemented using a single database (e.g., different parts of a single database). Example databases 107 and 108, such as depicted in the present embodiment, can be implemented using one or more storage systems associated with the context-aware language model evaluation platform 105.

Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the context-aware language model evaluation platform 105 are one or more input-output devices, which illustratively comprise keyboards, displays or other types of input-output devices in any combination. Such input-output devices can be used, for example, to support one or more user interfaces to the context-aware language model evaluation platform 105, as well as to support communication between context-aware language model evaluation platform 105 and other related systems and devices not explicitly shown.

Additionally, the context-aware language model evaluation platform 105 in the FIG. 1 embodiment is assumed to be implemented using at least one processing device. Each such processing device generally comprises at least one processor and an associated memory, and implements one or more functional modules for controlling certain features of the context-aware language model evaluation platform 105.

More particularly, the context-aware language model evaluation platform 105 in this embodiment can comprise a processor coupled to a memory and a network interface.

The processor illustratively comprises a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU), a neural processing unit (NPU), a data processing unit (DPU), a System-On-Chip (SOC) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage drive, a storage array or an integrated circuit containing memory, as well as a wide variety of other types of computer program products. The term "article of manufacture" as used herein should be understood to exclude transitory, propagating signals. These and other references to "drives" herein are intended to refer generally to storage devices, including solid-state drives (SSDs), and should therefore not be viewed as limited in any way to particular storage media types.

The network interface allows the context-aware language model evaluation platform 105 to communicate over the network 104 with the user devices 102, and illustratively comprises one or more conventional transceivers.

It is to be understood that the particular set of elements shown in FIG. 1 for the context-aware language model evaluation platform 105 involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the context-aware language model evaluation platform 105 and at least portions of the database system 106 can be on and/or part of the same processing platform.

Figure 2:
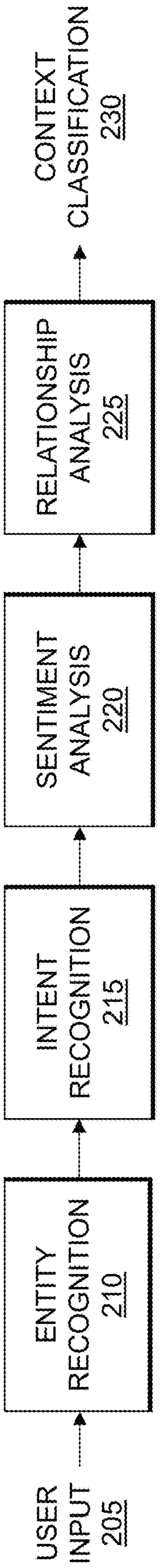
FIG. 2 illustrates the contextual understanding module of FIG. 1 in further detail in accordance with an illustrative embodiment.

As noted above, in some embodiments, the contextual understanding module 112 of FIG. 1 may employ NLP techniques to parse and understand the context of the user input. FIG. 2 illustrates an exemplary implementation of the contextual understanding module 112 of FIG. 1 in accordance with an illustrative embodiment. In the example of FIG. 2, a user input 205 (e.g., intended to be applied to at least one language model) is applied to an entity recognition step 210. Entity recognition (sometimes referred to as named entity recognition (NER)) is often considered to be an important aspect of NLP techniques and typically involves identifying and classifying key entities in the text of the user input 205 (using NER). The identified entities can include, for example, names of people, organizations, locations and/or dates. An exemplary process for implementing the entity recognition step 210 is discussed further below in conjunction with FIG. 3.

The user input 205 is applied to an intent recognition step 215. Intent recognition is often considered to be an important aspect of NLP techniques and typically involves identifying a purpose or intent behind the user input 205. The purpose or intent behind the user input 205 is an important aspect to understand what the user wants to achieve (such as booking a flight, asking a question or telling a story). An exemplary process for implementing the intent recognition step 215 is discussed further below in conjunction with FIG. 3.

The user input 205 is applied to a sentiment analysis step 220. Sentiment analysis is often considered to be an important aspect of NLP techniques to determine an emotional tone of a piece of text. The sentiment analysis involves classifying the text of the user input 205 as positive, negative or neutral, for example, and sometimes more granular emotions may be employed (e.g., joy, anger, sadness, etc.). An exemplary process for implementing the sentiment analysis step 220 is discussed further below in conjunction with FIG. 3.

The user input 205 is applied to a relationship analysis step 225. Relationship analysis is often considered to be an important aspect of NLP techniques to identify and understand the connections between entities (e.g., people and/or organizations) within the text of the user input 205. Relationship analysis can help to uncover the nature and dynamics of such relationships and to provide a context classification 230, providing valuable insights for various applications. An exemplary process for implementing the relationship analysis step 225 is discussed further below in conjunction with FIG. 4.

Figure 3:
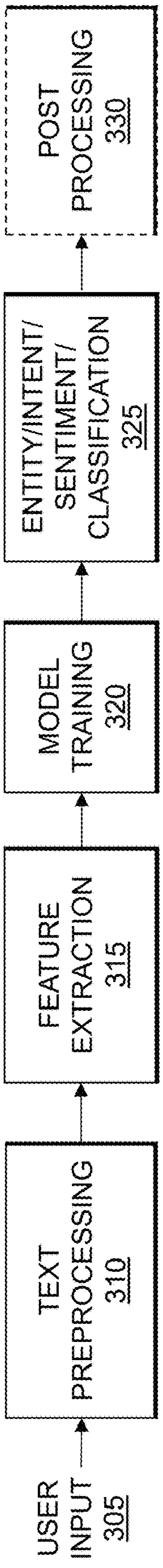
FIG. 3 illustrates the entity recognition, intent recognition and/or sentiment analysis of FIG. 2 in further detail in accordance with an illustrative embodiment.

FIG. 3 illustrates the entity recognition (step 210), intent recognition (step 215) and/or sentiment analysis (step 220) of FIG. 2 in further detail in accordance with an illustrative embodiment. In the example of FIG. 3, a user input 305 (e.g., intended to be applied to at least one language model) is applied to a text preprocessing step 310. The text preprocessing initially preprocesses the text of the user input 305 to clean and normalize the text. The text preprocessing may comprise, for example, tokenization, lowercasing and/or removing punctuation.

A feature extraction step 315 processes the preprocessed text of the user input 305 to extract features from the preprocessed text (such as word embeddings, part-of-speech tags and/or character-level features).

A model training step 320 trains at least one ML model (such as a neural network) on labeled training data using supervised learning techniques to recognize and classify entities, intents and/or sentiments. The ML models that may be used for entity recognition may include, for example, conditional random fields (CRFs), recurrent neural networks (RNNs) and/or transformer-based models (e.g., BERT language models). The ML models that may be used for intent recognition and/or sentiment analysis may include, for example, support vector machines (SVMs), RNNs and/or transformer-based models.

The one or more trained ML models are used in step 325 to perform entity, intent and/or sentiment classification, whereby tokens in the text of the user input 305 are classified into predefined entity, intent and/or sentiment categories.

In some embodiments, when the process of FIG. 3 is executed to identify entities in the user input 305, the output can optionally be post-processed in step 330 to ensure consistency and accuracy, such as merging multi-token entities.

Figure 4:
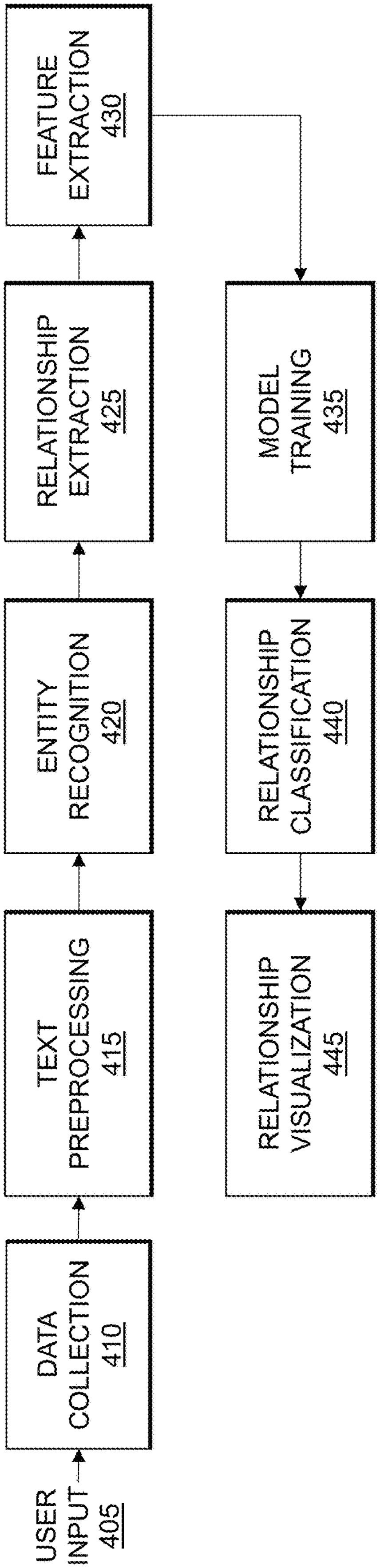
FIG. 4 illustrates the relationship analysis of FIG. 2 in further detail in accordance with an illustrative embodiment.

FIG. 4 illustrates the relationship analysis of FIG. 2 in further detail in accordance with an illustrative embodiment. In the example of FIG. 4, a user input 405 (e.g., intended to be applied to at least one language model) is applied to a data collection step 410 that gathers text data from one or more sources (such as social media, emails and/or reviews, for example). The gathered text data from step 410 is preprocessed in step 415 to clean and/or normalize the text, for example, by tokenizing the text, lowercasing the text and/or removing punctuation from the text.

The preprocessed text from step 415 is applied to an entity recognition step 420, whereby key entities (e.g., people and/or organizations) in the preprocessed text are identified in entity recognition step 420 using NER techniques. The preprocessed text from step 415 can be applied to a relationship extraction step 425 to determine connections between such entities using methods such as dependency parsing and/or co-occurrence analysis.

The preprocessed text from step 415 is processed in a feature extraction step 430 to extract features from the preprocessed text, such as interaction frequency, sentiment and/or context. The extracted features from feature extraction step 430 are applied to a model training step 435 that trains at least one ML model (e.g., an SVM or BERT language model) on labelled training data using supervised learning techniques to classify relationships. The at least one trained model from model training step 435 is used in a relationship classification step 440 to classify relationships in new text into predefined relationship types (e.g., professional or personal).

Finally, the classified relationships from relationship classification step 440 may optionally be visualized in a relationship visualization step 445 (e.g., using graphs or network diagrams to identify patterns and key influencers).

In some embodiments, the contextual understanding module 112 may automatically detect a context or domain of a given user input for a language model, for example, using at least one ML model trained to identify the context (e.g., the domain) based on the intent, identity, sentiment and relationship analysis.

As noted above, the dynamic context-based evaluation criteria adjustment module 110, in some embodiments, may dynamically adjust evaluation criteria based on a context of a user input (e.g., to ensure that the evaluation is relevant to the specific use case) and develop a set of scoring metrics (such as metrics for accuracy, relevance, empathy and/or creativity, which may be weighted differently depending on the context) that dynamically change based on the identified context.

Figure 5:
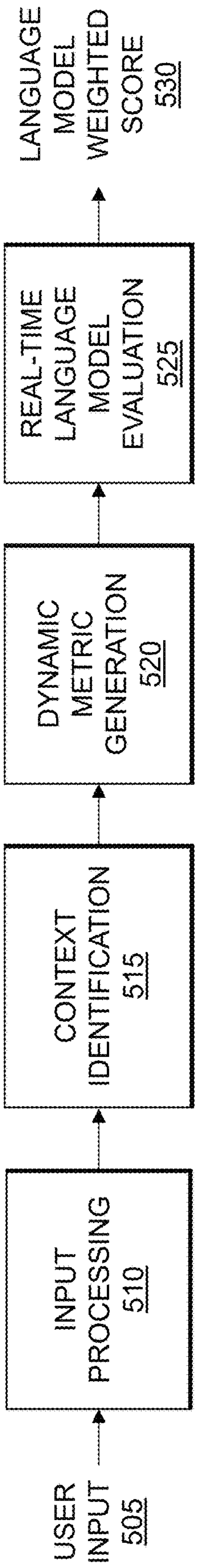
FIG. 5 illustrates the dynamic context-based evaluation criteria adjustment module of FIG. 1 in further detail in accordance with an illustrative embodiment.

FIG. 5 illustrates the dynamic context-based evaluation criteria adjustment module 110 of FIG. 1 in further detail in accordance with an illustrative embodiment. In the example of FIG. 5, a user input 505 (e.g., intended to be applied to at least one language model) is applied to an input processing step 510 that preprocesses the input text to prepare the input text for context analysis, as discussed further below in conjunction with FIG. 6.

The preprocessed input text from input processing step 510 is applied to a context identification step 515 that identifies the context of the input text by analyzing the entities, intents and/or relationships associated with the user input 505, as discussed further below in conjunction with FIG. 7.

The user input 505 and identified context associated with the user input 505, from context identification step 515, may be processed by a dynamic metric generation step 520 that generates and adjusts evaluation metrics from the model evaluation criteria pool 108 (e.g., a datastore storing the available evaluation criteria of an organization) of FIG. 1 based on the identified context from context identification step 515, as discussed further below in conjunction with FIG. 8. When a user adds a new evaluation criterion, the new evaluation criterion may be stored in the model evaluation criteria pool 108. The context or domain associated with the user input 505 may be processed through context identification and the resultant entity and intent may be used to suggest evaluation criterion for the user from the model evaluation criteria pool 108.

The user input 505 and metrics dynamically identified in dynamic metric generation step 520 may be applied to a real-time language model evaluation step 525 that evaluates a response of at least one language model in real-time, using the dynamically generated metrics from dynamic metric generation step 520, to calculate a language model weighted score 530 for the at least one language model, as discussed further below in conjunction with FIGS. 9 and 10.

Figure 6:
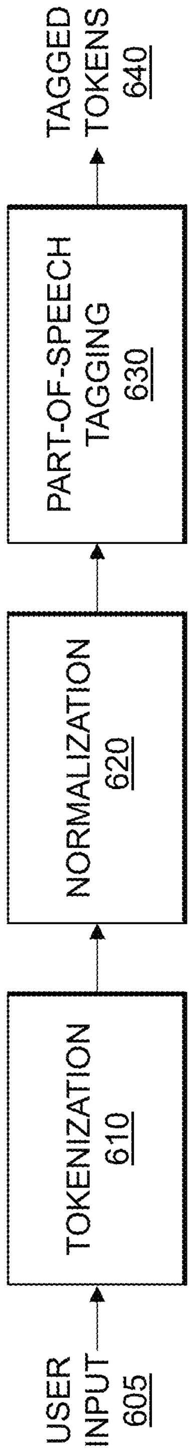
FIG. 6 illustrates the input processing of FIG. 5 in further detail in accordance with an illustrative embodiment.

FIG. 6 illustrates the input processing step 510 of FIG. 5 in further detail in accordance with an illustrative embodiment. In the example of FIG. 6, a user input 605 (e.g., intended to be applied to at least one language model) is applied to a tokenization step 610 that splits the input text into individual tokens (e.g., words or phrases). The tokenized text from tokenization step 610 is applied to a normalization step 620 that converts the tokenized text to lowercase text with punctuation removed and potentially other text normalization tasks. Finally, the normalized text from normalization step 620 is applied to a part-of-speech tagging step 630 that identifies the grammatical parts of speech for each token (e.g., assigns a grammatical category (such as noun, verb or adjective) to each token in the normalized text, based on a definition and context of the respective token to generate a set of tagged tokens 640.

Figure 7:
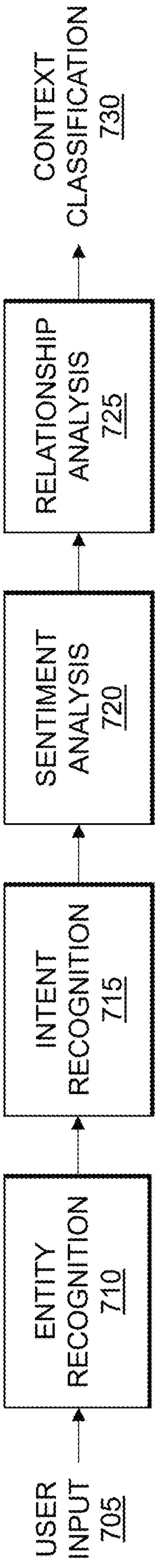
FIG. 7 illustrates the context identification of FIG. 5 in further detail in accordance with an illustrative embodiment.

FIG. 7 illustrates the context identification step 515 of FIG. 5 in further detail in accordance with an illustrative embodiment. In the example of FIG. 7, a user input 705 (e.g., intended to be applied to at least one language model) is applied to an entity recognition step 710. Entity recognition involves identifying and classifying key entities in the text of the user input 705 (using NER). The identified entities can include, for example, names of people, organizations, locations and/or dates. An exemplary process for implementing the entity recognition of entity recognition step 710 was discussed above in conjunction with FIG. 3.

The user input 705 may be applied to an intent recognition step 715. Intent recognition involves identifying a purpose or intent behind the user input 705. The purpose or intent behind the user input 705 is an important aspect to understand what the user wants to achieve (such as booking a flight, asking a question or telling a story). An exemplary process for implementing the intent recognition of intent recognition step 715 was discussed above in conjunction with FIG. 3.

The user input 705 may be applied to a sentiment analysis step 720. Sentiment analysis may be employed to determine an emotional tone of a piece of text. The sentiment analysis involves classifying the text of the user input 705 as positive, negative or neutral, for example, and sometimes more granular emotions may be employed (e.g., joy, anger, sadness, etc.). An exemplary process for implementing the sentiment analysis of sentiment analysis step 720 was discussed above in conjunction with FIG. 3.

The user input 705 may be applied to a relationship analysis step 725. Relationship analysis may be employed to identify and understand the connections between entities (e.g., people and/or organizations) within the text of the user input 705. Relationship analysis can help to uncover the nature and dynamics of such relationships and to provide a context classification 730, providing valuable insights for various applications. An exemplary process for implementing the relationship analysis of relationship analysis step 725 was discussed above in conjunction with FIG. 4.

Figure 8:
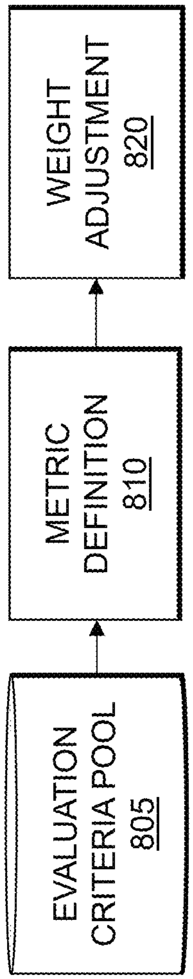
FIG. 8 illustrates the dynamic metric generation of FIG. 5 in further detail in accordance with an illustrative embodiment.

FIG. 8 illustrates the dynamic metric generation step 520 of FIG. 5 in further detail in accordance with an illustrative embodiment. In the example of FIG. 8, a metric definition step 810 defines a set of evaluation metrics (e.g., accuracy, relevance, empathy and/or creativity) based on suggestions from an evaluation criteria pool 805 (e.g., the model evaluation criteria pool 108), for example, and potentially additional suggestions from the user. The defined evaluation metrics from metric definition step 810 are processed by a weight adjustment step 820 that dynamically adjusts the weights of the defined evaluation metrics based at least in part on the context (e.g., domain) determined in step 515, as discussed above in conjunction with FIG. 7.

Figure 9:
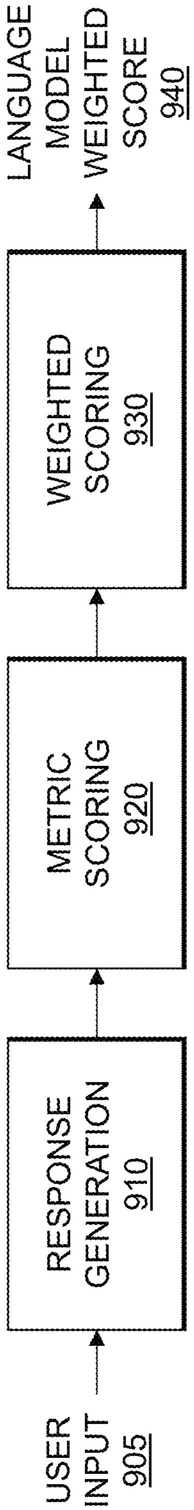
FIG. 9 illustrates the real-time language model evaluation of FIG. 5 in further detail in accordance with an illustrative embodiment.

FIG. 9 illustrates the real-time language model evaluation step 525 of FIG. 5 in further detail in accordance with an illustrative embodiment. In the example of FIG. 9, a response from a language model being evaluated is initially generated in step 910, based at least in part on a user input 905. The generated response from step 910 is then scored in a metric scoring step 920 using the dynamically selected and adjusted metrics determined using the process of FIG. 8. A language model weighted score 940 is calculated in a weighted scoring step 930 based at least in part on the adjusted metric weights, as discussed further below in conjunction with FIG. 10.

Figure 10:
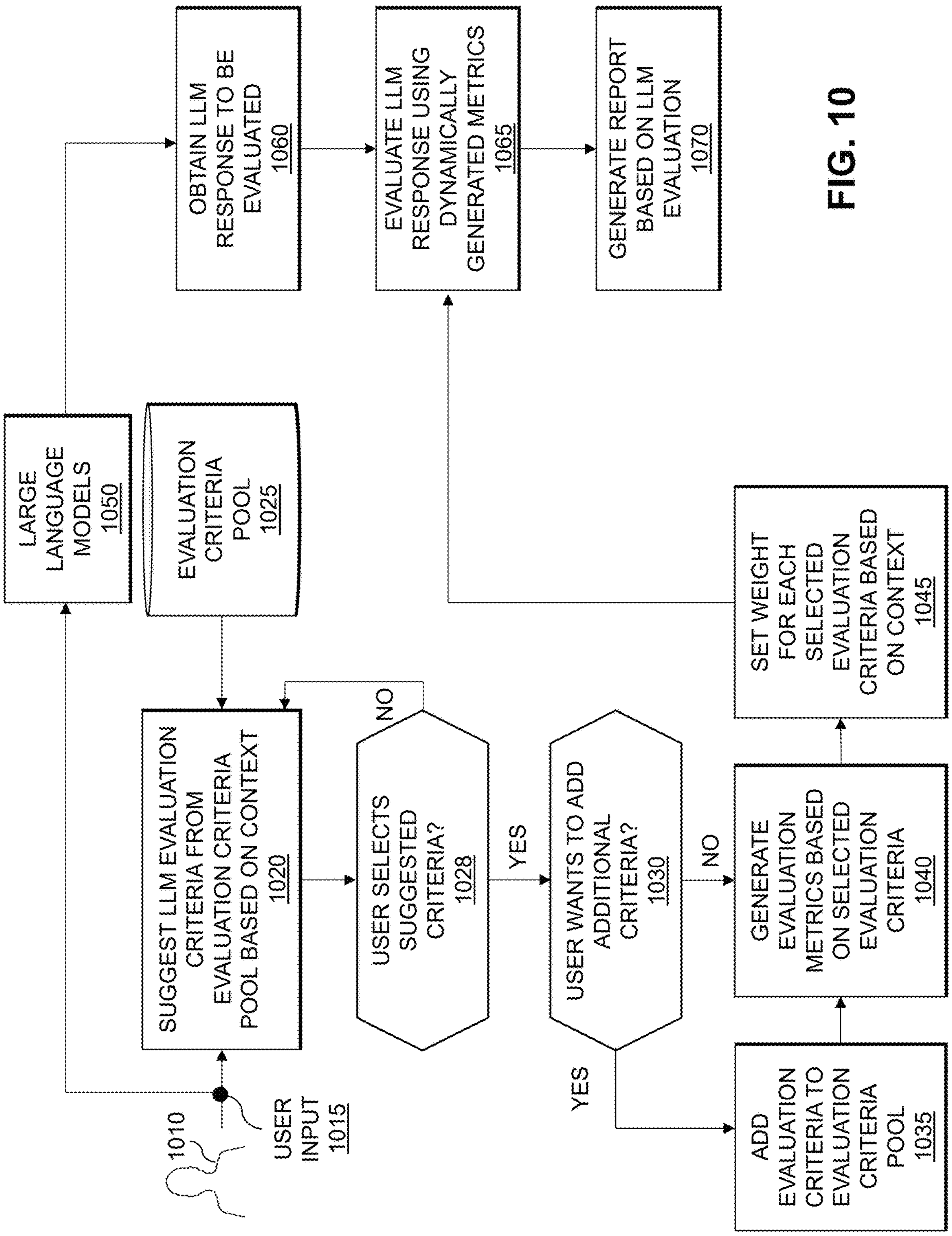
FIGS. 10 and 11 are flow diagrams illustrating exemplary implementations of processes for dynamic context-based evaluation of language models in accordance with illustrative embodiments.

FIG. 10 is a flow diagram illustrating an exemplary implementation of a process for dynamic context-based evaluation of language models in accordance with an illustrative embodiment. In the example of FIG. 10, a user 1010 provides a user input 1015, and optionally designates a context or a user domain associated with the user input 1015. In some embodiments, the context or domain of the user input 1015 may be derived using at least one trained ML model, as described herein.

In step 1020, the process of FIG. 10 suggests one or more LLM evaluation criteria from an evaluation criteria pool 1025 (e.g., the model evaluation criteria pool 108) based on a context associated with the user input 1015, for example, using a trained ML model (e.g., trained to suggest evaluation criteria based on a context of a user input). The context (e.g., a domain) associated with the user input 1015 may be provided by the user 1010 or derived, for example, using a trained ML model (e.g., trained to determine a context of a user input using a supervised learning technique that processes multiple user inputs and corresponding tagged contexts as training data). A test is performed in step 1028 to determine if the user selects the criteria suggested in step 1020. If it is determined in step 1028 that the user does not select the suggested criteria, then program control returns to step 1020 for the process of FIG. 10 to suggest additional criteria.

If, however, it is determined in step 1028 that the user selects the suggested criteria, then a further test is performed in step 1030 to determine if the user wants to add additional evaluation criteria. If it is determined in step 1030 that the user wants to add additional evaluation criteria, then the new evaluation criteria is added to the evaluation criteria pool 1025 in step 1035.

If, however, it is determined in step 1030 that the user does not want to add additional evaluation criteria, or if the user wanted to add additional evaluation criteria, which has been added to the evaluation criteria pool 1025 in step 1035, then one or more evaluation metrics are generated in step 1040 based at least in part on the selected evaluation criteria.

A weight is set in step 1045 for each selected evaluation criteria based on a context or user domain associated with the user input 1015.

In addition, the user input 1015 is applied to one or more LLMs in step 1050 to obtain respective LLM responses in step 1060 to be evaluated using the disclosed dynamic context-based language model evaluation techniques.

The weighted evaluation criteria from step 1045 are used in step 1065 to evaluate the LLM response from step 1060 using the weighted dynamically generated metrics. The varying weights may be identified using a ML model trained to identify the weights (e.g., scores between 0 and 10) based on the selected evaluation criteria and the provided (or derived) user context or domain. Generally, the trained ML model will score the weight based on how related the evaluation criteria is to the particular user context or domain. A report may be generated in step 1070 based on the LLM evaluation.

The evaluation reports generated by the process of FIG. 10 may be employed to determine the best LLM for a specific use case. When a user wants to identify the best-performing LLM for content writing, for example, or another particular task, the user may provide the context or domain to the disclosed context-aware language model evaluation platform that will suggest relevant evaluation criteria from the pool (e.g., in step 1020). The user can also add new evaluation criteria in step 1030, which may be stored in the pool in step 1035 for future reference.

The context-aware language model evaluation platform generates a metric based on the selected and newly created criteria, assigning a weight to each model evaluation criteria based on the provided or derived context or user domain associated with the user input 1015. A ML model, for example, may dynamically allocate a weight for each model evaluation criteria. The user then provides the user input 1015 for testing a given LLM, and the LLM generates a response. The generated response is evaluated in step 1065 against the dynamically generated metrics (e.g., weighted metrics), with scores assigned to each evaluation criterion and an overall score calculated by aggregating the weighted scores for each criterion. Multiple LLMs can be evaluated simultaneously (e.g., in a language model contest), allowing for a comparison based on the generated evaluation report for the specific domain. To enhance accuracy, the context-aware language model evaluation platform can also process multiple inputs and generate an overall score for each LLM.

In some embodiments, a feedback loop may be integrated into the context-aware language model evaluation platform to allow for continuous refinement and adaptation based on user feedback and performance data. In this manner, the evaluation criteria remain relevant and effective over time.

Figure 11:
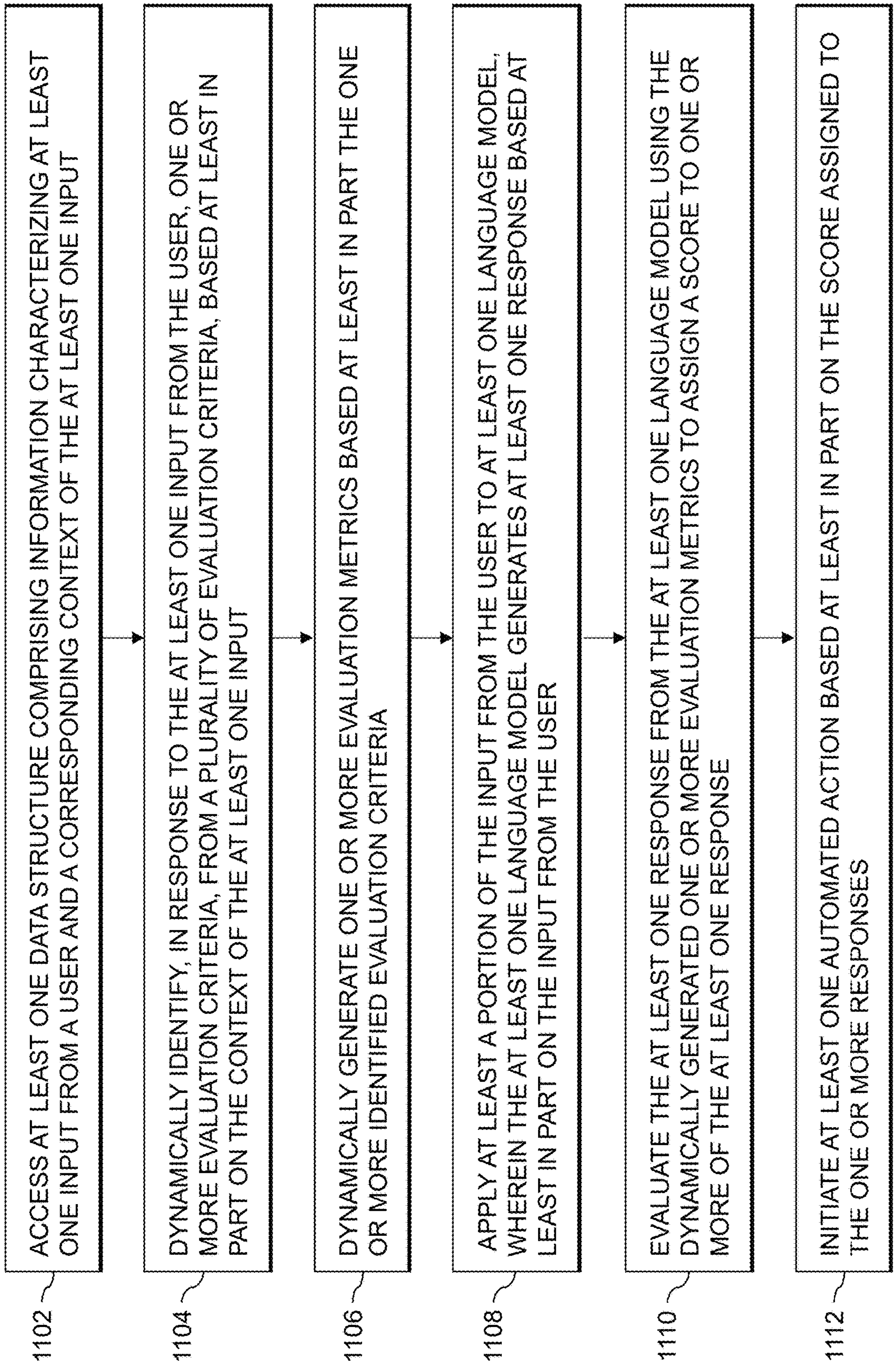

FIG. 11 is a flow diagram illustrating an exemplary implementation of a process for dynamic context-based evaluation of language models in accordance with an illustrative embodiment. In the example of FIG. 11, at least one data structure is accessed in step 1102 comprising information characterizing at least one input from a user and a corresponding context of the at least one input. In step 1104, in response to the at least one input from the user, one or more evaluation criteria are dynamically identified, from a plurality of evaluation criteria, based at least in part on the context of the at least one input.

One or more evaluation metrics are dynamically generated in step 1106 based at least in part on the one or more identified evaluation criteria. At least a portion of the input from the user is applied in step 1108 to at least one language model, wherein the at least one language model generates at least one response based at least in part on the input from the user.

The at least one response from the at least one language model is evaluated in step 1110 using the dynamically generated one or more evaluation metrics to assign a score to one or more of the at least one response. At least one automated action is initiated in step 1112 based at least in part on the score assigned to the one or more responses.

As used herein, the term "context," associated with one or more user inputs, shall be broadly construed to encompass, for example, an industry or business domain (e.g., customer support, healthcare, finance or education) associated with a user input, as well as other scenarios, circumstances and/or background information that provide a setting for the user input, as would be apparent to a person of ordinary skill in the art.

It should be noted that the term "data structure" as used herein is intended to be broadly construed. A data structure, such as any single one of or combination of the data structures referred to above, may provide a portion of a larger data structure, or any one of or combination of the data structures may be combinations of multiple smaller data structures. Therefore, the data structures referred to above may be different parts of a same overall data structure, or one or more of the data structures could be made up of multiple smaller data structures. The data structures may include tables, vectors, embeddings, or various other data structures. In some embodiments, the data structures are specifically formatted or generated such that they are suitable for use as at least one of an input to and an output from an ML model. It should further be appreciated that "generating" a data structure may encompass, for example, populating an existing or previously-created data structure with one or more data items and that "accessing" a data structure may encompass, for example, obtaining a portion (e.g., one or more data items) of one or more data structures by means of a query, select or filter operation, for example.

In at least one embodiment, the evaluating the at least one response comprises assigning a score to each of the at least one response for each of the dynamically generated one or more evaluation metrics and assigning an overall score to each of the at least one response based at least in part on an aggregation of the scores for each of the dynamically generated one or more evaluation metrics. The process of FIG. 11 may further comprise querying a user for one or more additional evaluation criteria and adding the one or more additional evaluation criteria to the plurality of evaluation criteria.

In one or more embodiments, the process of FIG. 11 may further comprise assigning a weight to each of the one or more evaluation metrics based at least in part on the context of the at least one input. The weights may be assigned to the one or more evaluation criteria using at least one trained ML model based at least in part on a degree of relatedness of the one or more evaluation criteria to the context of the at least one input.

In some embodiments, the at least one language model comprises a plurality of language models and wherein the scores assigned to the respective responses from the plurality of language models are compared to assess the plurality of language models for use in the context of the at least one input. The dynamically identifying the one or more evaluation criteria may be based at least in part on one or more of an intent of the at least one input from the user, one or more entities associated with the at least one input from the user, and one or more relationships among the one or more entities.

In at least one embodiment, the at least one automated action based on the assigned score may comprise one or more of modifying at least a portion of one or more language models based on the assigned score, retraining one or more language models based on the assigned score and updating one or more prompts and/or queries applied to one or more language models based on the assigned score. For example, a language model having an assigned score below a designated threshold, or in a designated performance percentile relative to other language models, may be a candidate for modification and/or retraining. Likewise, a language model having an assigned score below a designated threshold, or in a designated performance percentile relative to other language models, may benefit from one or more modifications to the prompts and/or queries applied to the language model. In this manner, the evaluation result (e.g., the assigned score) may be fed back to the context-aware language model evaluation platform 105, for example, to modify and/or retrain (or otherwise update) the evaluated language models, or to update the prompts and/or queries applied to such evaluated language models.

The particular processing operations and other network functionality described in conjunction with FIGS. 2 through 11, for example, are presented by way of illustrative example only, and should not be construed as limiting the scope of the disclosure in any way. Alternative embodiments can use other types of processing operations for dynamic context-based evaluation of language models. For example, the ordering of the process steps may be varied in other embodiments, or certain steps may be performed concurrently with one another rather than serially. In one aspect, the process can skip one or more of the steps. In other aspects, one or more of the steps are performed simultaneously. In some aspects, additional steps can be performed.

Embodiments described herein can provide improved techniques for continuous interactive dynamic context-based evaluation of language models. Improved techniques for user interaction are provided where the user and the system create a continuous feedback loop while generating inputs to the process and making adjustments to the generated content accordingly. There are visual cues that may be presented to facilitate the interaction, and an editable timeline of assumptions and decisions that can be modified at any time to reevaluate the generated output.

Among other benefits, the disclosed techniques for dynamic context-based evaluation of language models can provide a better evaluation of language models because evaluation criteria are selected in real-time based on the particular context of the user input. In some embodiments, the user input can be applied to multiple language models for evaluation to identify the best language model for a particular use case. By understanding the specific context or domain of a user input, the disclosed language model evaluation engine can tailor the evaluation criteria to be more relevant and accurate. In this manner, the evaluation criteria for a given language model response may be dynamically adjusted based on the context of the user input (e.g., to ensure that the evaluation is relevant to the specific use case) and develop a set of scoring metrics (such as metrics for accuracy, relevance, empathy and/or creativity, which may be weighted differently depending on the context) that dynamically change based on the identified context. The dynamic adjustment of the evaluation metrics based on the context or domain of the user input can ensure that the language model is assessed according to the specific requirements of each use case (leading to a more precise and meaningful evaluation).

For example, in a customer support scenario, the disclosed language model evaluation engine can prioritize empathy, accuracy and response time evaluation criteria, while in a creative writing scenario, the disclosed language model evaluation engine can focus on creativity and coherence evaluation criteria. In other examples, in a healthcare scenario, the disclosed language model evaluation engine can focus on accuracy, empathy and clarity evaluation criteria, while in a finance scenario, accuracy, relevance and compliance evaluation criteria can be emphasized.

In addition, the disclosed context-aware language model evaluation platform can identify biases in language models as they occur in real time, allowing for immediate intervention and correction. Further, the continuous evaluation of language models allows the language models to be updated and/or redefined to reduce bias. The context in which biases appear can be identified which can help to understand why certain biases occur and how they can be avoided. The context-aware language model evaluation platform can evaluate multiple aspects of a performance of a language model, such as accuracy, relevance, empathy and creativity, thereby providing a comprehensive assessment. This holistic approach ensures that critical dimensions of performance are considered.

In some embodiments, the context-aware language model evaluation platform may be employed to train language models to better respond to more advanced prompts. For example, using prompt engineering, a question may be asked, as follows: "As a home chef, I would like a recipe for a chicken sandwich for elementary school children, keep it fun like a summer picnic." In this case, the evaluation criteria generated by the context-aware language model evaluation platform may be nutritional value, engagement, fun element, clarity and simplicity, for example. These evaluation criteria help to train the language models to better respond to the advanced prompt engineering.

By providing detailed and contextually relevant evaluations, the context-aware language model evaluation platform can offer valuable insights that inform decision-making processes and enable data-driven decisions.

One or more embodiments of the disclosure provide improved methods, apparatus and computer program products for dynamic context-based evaluation of language models. The foregoing applications and associated embodiments should be considered as illustrative only, and numerous other embodiments can be configured using the techniques disclosed herein, in a wide variety of different applications.

It should also be understood that the disclosed techniques for dynamic context-based evaluation of language models, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for dynamic context-based evaluation of language models may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute and/or storage services can be offered to cloud infrastructure tenants or other system users as a Platform-as-a-Service (PaaS) model, an Infrastructure-as-a-Service (IaaS) model, a Storage-as-a-Service (STaaS) model and/or a Function-as-a-Service (FaaS) model, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based dynamic language model evaluation engine, or portions thereof, are illustratively implemented for use by tenants of such a multi-tenant environment.

Cloud infrastructure as disclosed herein can include cloud-based systems. Virtual machines provided in such systems can be used to implement at least portions of a cloud-based dynamic language model evaluation platform in illustrative embodiments. The cloud-based systems can include object stores.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 12 and 13. These platforms may also be used to implement at least portions of other information processing systems in other embodiments.

Figure 12:
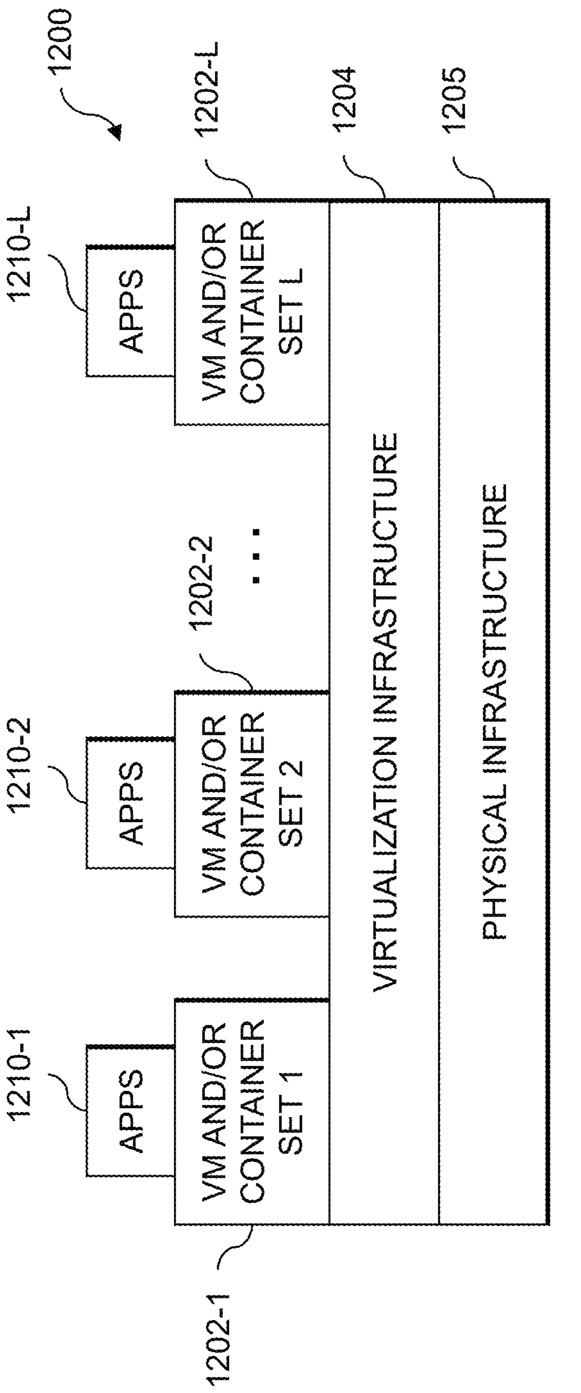
FIG. 12 illustrates an exemplary processing platform that may be used to implement at least a portion of one or more embodiments of the disclosure comprising a cloud infrastructure.

FIG. 12 shows an example processing platform comprising cloud infrastructure 1200. The cloud infrastructure 1200 comprises a combination of physical and virtual processing resources that may be utilized to implement at least a portion of the information processing system 100. The cloud infrastructure 1200 comprises multiple virtual machines (VMs) and/or container sets 1202-1, 1202-2, . . . 1202-L implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, . . . 1210-L running on respective ones of the VMs/container sets 1202-1, 1202-2, . . . 1202-L under the control of the virtualization infrastructure 1204. The VMs/container sets 1202 may comprise respective VMs, respective sets of one or more containers, or respective sets of one or more containers running in VMs.

In some implementations of the FIG. 12 embodiment, the VMs/container sets 1202 comprise respective VMs implemented using virtualization infrastructure 1204 that comprises at least one hypervisor. Such implementations can provide dynamic language model evaluation functionality of the type described above for one or more processes running on a given one of the VMs. For example, each of the VMs can implement control logic for dynamic language model evaluation and associated functionality for dynamically determining one or more model evaluation criteria based on a domain of the user.

An example of a hypervisor platform that may be used to implement a hypervisor within the virtualization infrastructure 1204 is a compute virtualization platform which may have an associated virtual infrastructure management system such as server management software. The underlying physical machines may comprise one or more distributed processing platforms that include one or more storage systems.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system. Such implementations can provide dynamic language model evaluation functionality of the type described above for one or more processes running on different ones of the containers. For example, a container host device supporting multiple containers of one or more container sets can implement one or more instances of control logic for dynamic language model evaluation and associated functionality for dynamically determining one or more model evaluation criteria based on a domain of the user.

As is apparent from the above, one or more of the processing modules or other components of information processing system 100 may each run on a computer, server, storage device or other processing platform element. A given such element may be viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises at least a portion of the given system and includes a plurality of processing devices, denoted 1302-1, 1302-2, 1302-3, . . . 1302-K, which communicate with one another over a network 1304. The network 1304 may comprise any type of network, such as a WAN, a LAN, a satellite network, a telephone or cable network, a cellular network, a wireless network such as WiFi or WiMAX, or various portions or combinations of these and other types of networks.

The processing device 1302-1 in the processing platform 1300 comprises a processor 1310 coupled to a memory 1312. The processor 1310 may comprise a microprocessor, a microcontroller, an ASIC, an FPGA, a CPU, a GPU, a TPU, a VPU, an NPU, a DPU, an SOC or other type of processing circuitry, as well as portions or combinations of such circuitry elements, and the memory 1312, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage drive or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and the given system may include additional or alternative processing platforms, as well as numerous distinct processing platforms in any combination, with each such platform comprising one or more computers, storage devices or other processing devices.

Figure 13:
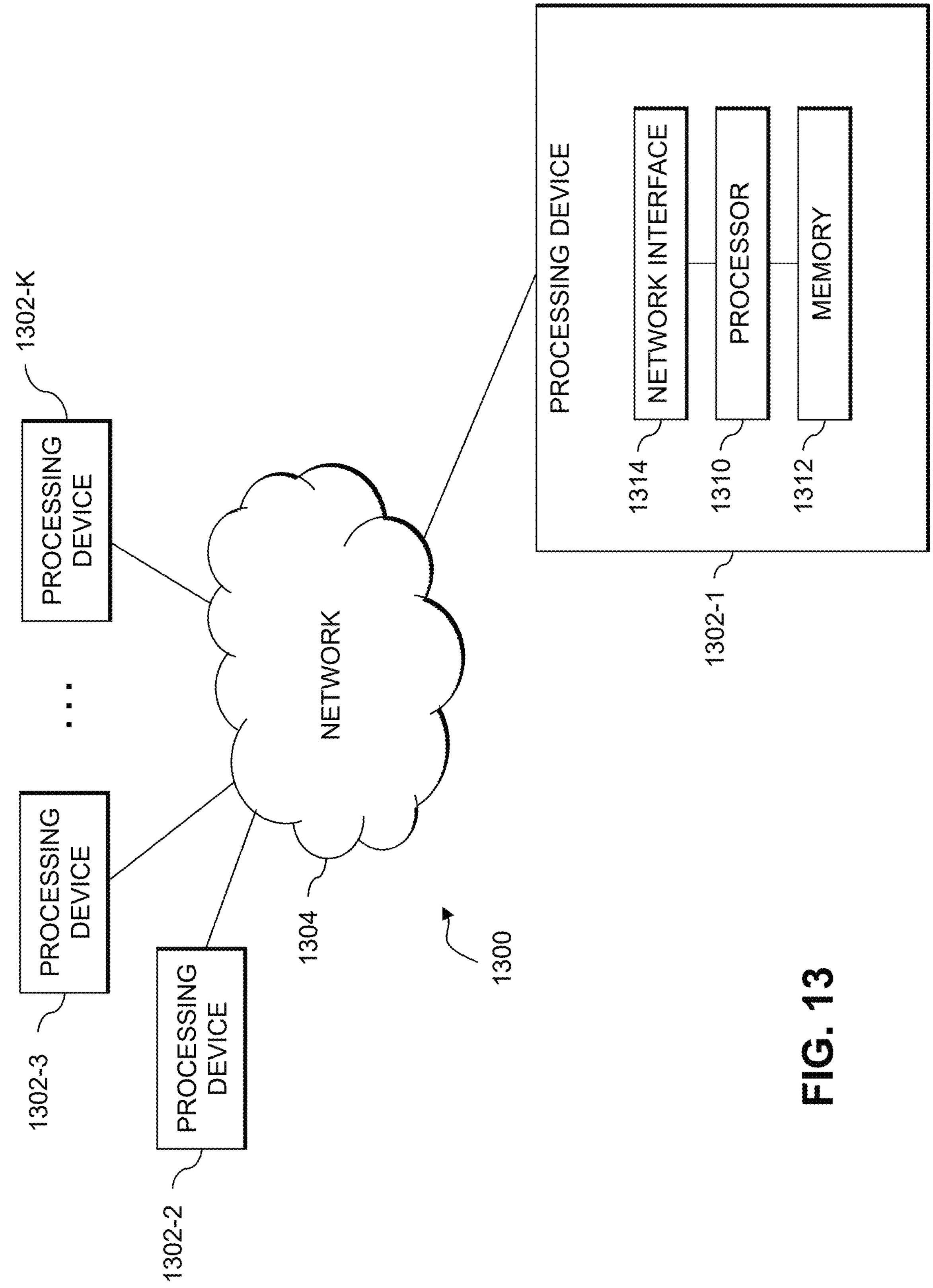
FIG. 13 illustrates another exemplary processing platform that may be used to implement at least a portion of one or more embodiments of the disclosure.

Multiple elements of an information processing system may be collectively implemented on a common processing platform of the type shown in FIG. 12 or 13, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

accessing at least one data structure comprising information characterizing at least one input from a user and a corresponding context of the at least one input;

dynamically identifying, in response to the at least one input from the user, one or more evaluation criteria, from a plurality of evaluation criteria, for evaluating at least one response to be generated by at least one language model, based at least in part on the context of the at least one input;

dynamically generating one or more evaluation metrics based at least in part on the one or more identified evaluation criteria;

applying at least a portion of the input from the user to the at least one language model, wherein the at least one language model generates the at least one response based at least in part on the input from the user;

evaluating the at least one response from the at least one language model using the dynamically generated one or more evaluation metrics to assign a score, using at least one processing device comprising a processor coupled to a memory, to one or more of the at least one response; and initiating at least one automated action based at least in part on the score assigned to the one or more responses, wherein the at least one automated action comprises one or more of (i) updating one or more of the at least one language model, at least one prompt applied to the at least one language model and at least one query applied to the at least one language model and (ii) retraining the at least one language model;

wherein the method is performed by at least one processing device comprising a processor coupled to a memory.

2. The method of claim 1, wherein the evaluating the at least one response comprises assigning a score to each of the at least one response for each of the dynamically generated one or more evaluation metrics and assigning an overall score to each of the at least one response based at least in part on an aggregation of the scores for each of the dynamically generated one or more evaluation metrics.

3. The method of claim 1, further comprising querying a user for one or more additional evaluation criteria and adding the one or more additional evaluation criteria to the plurality of evaluation criteria.

4. The method of claim 1, further comprising assigning a weight to each of the one or more evaluation metrics based at least in part on the context of the at least one input.

5. The method of claim 4, wherein the weights are assigned to the one or more evaluation criteria using at least one trained machine learning model based at least in part on a degree of relatedness of the one or more evaluation criteria to the context of the at least one input.

6. The method of claim 1, wherein the at least one language model comprises a plurality of language models and wherein the scores assigned to the respective responses from the plurality of language models are compared to assess the plurality of language models for use in the context of the at least one input.

7. The method of claim 1, wherein the dynamically identifying the one or more evaluation criteria is based at least in part on one or more of an intent of the at least one input from the user, one or more entities associated with the at least one input from the user, and one or more relationships among the one or more entities.

8. An apparatus comprising:

at least one processing device comprising a processor coupled to a memory;

the at least one processing device being configured to implement the following steps:

accessing at least one data structure comprising information characterizing at least one input from a user and a corresponding context of the at least one input;

dynamically identifying, in response to the at least one input from the user, one or more evaluation criteria, from a plurality of evaluation criteria, for evaluating at least one response to be generated by at least one language model, based at least in part on the context of the at least one input;

dynamically generating one or more evaluation metrics based at least in part on the one or more identified evaluation criteria;

applying at least a portion of the input from the user to the at least one language model, wherein the at least one language model generates the at least one response based at least in part on the input from the user;

evaluating the at least one response from the at least one language model using the dynamically generated one or more evaluation metrics to assign a score, using at least one processing device comprising a processor coupled to a memory, to one or more of the at least one response; and initiating at least one automated action based at least in part on the score assigned to the one or more responses, wherein the at least one automated action comprises one or more of (i) updating one or more of the at least one language model, at least one prompt applied to the at least one language model and at least one query applied to the at least one language model and (ii) retraining the at least one language model.

9. The apparatus of claim 8, wherein the evaluating the at least one response comprises assigning a score to each of the at least one response for each of the dynamically generated one or more evaluation metrics and assigning an overall score to each of the at least one response based at least in part on an aggregation of the scores for each of the dynamically generated one or more evaluation metrics.

10. The apparatus of claim 8, further comprising querying a user for one or more additional evaluation criteria and adding the one or more additional evaluation criteria to the plurality of evaluation criteria.

11. The apparatus of claim 8, further comprising assigning a weight to each of the one or more evaluation metrics based at least in part on the context of the at least one input.

12. The apparatus of claim 11, wherein the weights are assigned to the one or more evaluation criteria using at least one trained machine learning model based at least in part on a degree of relatedness of the one or more evaluation criteria to the context of the at least one input.

13. The apparatus of claim 8, wherein the at least one language model comprises a plurality of language models and wherein the scores assigned to the respective responses from the plurality of language models are compared to assess the plurality of language models for use in the context of the at least one input.

14. The apparatus of claim 8, wherein the dynamically identifying the one or more evaluation criteria is based at least in part on one or more of an intent of the at least one input from the user, one or more entities associated with the at least one input from the user, and one or more relationships among the one or more entities.

15. A non-transitory processor-readable storage medium having stored therein program code of one or more software programs, wherein the program code when executed by at least one processing device causes the at least one processing device to perform the following steps:

accessing at least one data structure comprising information characterizing at least one input from a user and a corresponding context of the at least one input;

dynamically identifying, in response to the at least one input from the user, one or more evaluation criteria, from a plurality of evaluation criteria, for evaluating at least one response to be generated by at least one language model, based at least in part on the context of the at least one input;

dynamically generating one or more evaluation metrics based at least in part on the one or more identified evaluation criteria;

applying at least a portion of the input from the user to the at least one language model, wherein the at least one language model generates the at least one response based at least in part on the input from the user;

evaluating the at least one response from the at least one language model using the dynamically generated one or more evaluation metrics to assign a score, using at least one processing device comprising a processor coupled to a memory, to one or more of the at least one response; and initiating at least one automated action based at least in part on the score assigned to the one or more responses, wherein the at least one automated action comprises one or more of (i) updating one or more of the at least one language model, at least one prompt applied to the at least one language model and at least one query applied to the at least one language model and (ii) retraining the at least one language model.

16. The non-transitory processor-readable storage medium of claim 15, wherein the evaluating the at least one response comprises assigning a score to each of the at least one response for each of the dynamically generated one or more evaluation metrics and assigning an overall score to each of the at least one response based at least in part on an aggregation of the scores for each of the dynamically generated one or more evaluation metrics.

17. The non-transitory processor-readable storage medium of claim 15, further comprising querying a user for one or more additional evaluation criteria and adding the one or more additional evaluation criteria to the plurality of evaluation criteria.

18. The non-transitory processor-readable storage medium of claim 15, further comprising assigning a weight to each of the one or more evaluation metrics based at least in part on the context of the at least one input, wherein the weights are assigned to the one or more evaluation criteria using at least one trained machine learning model based at least in part on a degree of relatedness of the one or more evaluation criteria to the context of the at least one input.

19. The non-transitory processor-readable storage medium of claim 15, wherein the at least one language model comprises a plurality of language models and wherein the scores assigned to the respective responses from the plurality of language models are compared to assess the plurality of language models for use in the context of the at least one input.

20. The non-transitory processor-readable storage medium of claim 15, wherein the dynamically identifying the one or more evaluation criteria is based at least in part on one or more of an intent of the at least one input from the user, one or more entities associated with the at least one input from the user, and one or more relationships among the one or more entities.

* * * * *